(12) United States Patent
Katrak et al.

(10) Patent No.: US 8,170,750 B2
(45) Date of Patent: May 1, 2012

(54) PARAMETRIC REMEDIAL ACTION STRATEGY FOR AN ACTIVE FRONT STEER SYSTEM

(75) Inventors: Kerfegar K. Katrak, Fenton, MI (US); Robert R. Bolio, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1363 days.

(21) Appl. No.: 11/759,395

(22) Filed: Jun. 7, 2007

(65) Prior Publication Data

US 2008/0306654 A1 Dec. 11, 2008

(51) Int. Cl.
*G06F 11/00* (2006.01)

(52) U.S. Cl. .......................... 701/41; 180/422
(58) Field of Classification Search ............... 701/1, 36, 701/41, 42; 180/421–423, 446
See application file for complete search history.

(56) References Cited

U.S. PATENT DOCUMENTS

| | | | | |
|---|---|---|---|---|
| 5,707,117 | A | * | 1/1998 | Hu et al. .................. 303/122.08 |
| 6,198,988 | B1 | * | 3/2001 | Tseng ................................ 701/1 |
| 6,318,819 | B1 | * | 11/2001 | Bohm et al. .................. 303/122 |
| 6,719,087 | B2 | * | 4/2004 | Demerly ...................... 180/402 |

* cited by examiner

*Primary Examiner* — Dalena Tran
(74) *Attorney, Agent, or Firm* — Ingrassia Fisher & Lorenz, P.C.

(57) ABSTRACT

A vehicle parametric active front steering (AFS) system remedial action is described herein. AFS system modules inter-communicate via messages containing parameters. The AFS system detects a message error, determines an invalid parameter, and takes appropriate remedial action. An error is detected if an error condition is satisfied or if occurrence of incorrect messages reaches or exceeds a certain predetermined frequency. The AFS system takes the remedial action by setting default values of valid parameters corresponding to the invalid parameter.

19 Claims, 9 Drawing Sheets

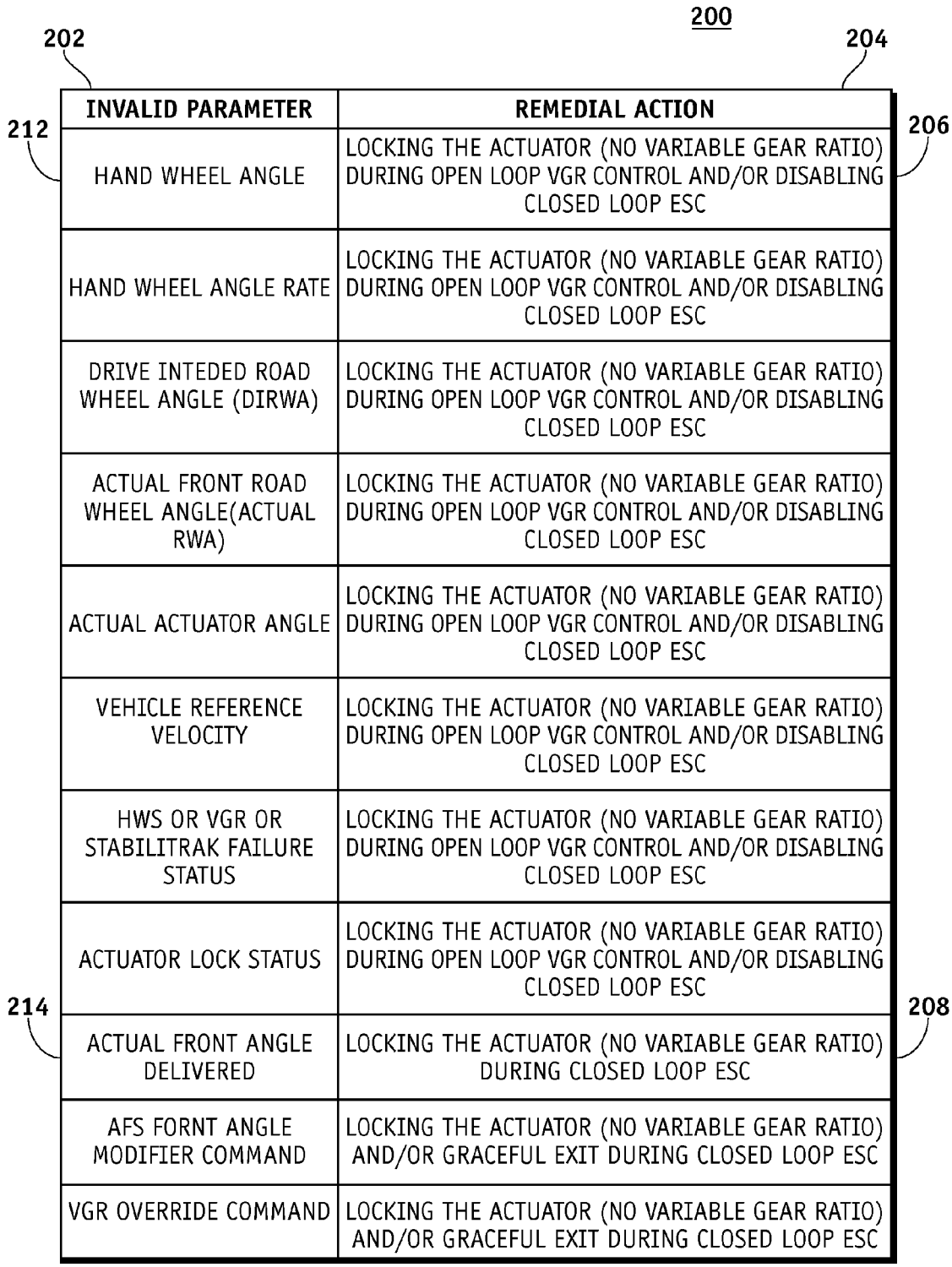

| INVALID PARAMETER | REMEDIAL ACTION |
|---|---|
| HAND WHEEL ANGLE | LOCKING THE ACTUATOR (NO VARIABLE GEAR RATIO) DURING OPEN LOOP VGR CONTROL AND/OR DISABLING CLOSED LOOP ESC |
| HAND WHEEL ANGLE RATE | LOCKING THE ACTUATOR (NO VARIABLE GEAR RATIO) DURING OPEN LOOP VGR CONTROL AND/OR DISABLING CLOSED LOOP ESC |
| DRIVE INTEDED ROAD WHEEL ANGLE (DIRWA) | LOCKING THE ACTUATOR (NO VARIABLE GEAR RATIO) DURING OPEN LOOP VGR CONTROL AND/OR DISABLING CLOSED LOOP ESC |
| ACTUAL FRONT ROAD WHEEL ANGLE(ACTUAL RWA) | LOCKING THE ACTUATOR (NO VARIABLE GEAR RATIO) DURING OPEN LOOP VGR CONTROL AND/OR DISABLING CLOSED LOOP ESC |
| ACTUAL ACTUATOR ANGLE | LOCKING THE ACTUATOR (NO VARIABLE GEAR RATIO) DURING OPEN LOOP VGR CONTROL AND/OR DISABLING CLOSED LOOP ESC |
| VEHICLE REFERENCE VELOCITY | LOCKING THE ACTUATOR (NO VARIABLE GEAR RATIO) DURING OPEN LOOP VGR CONTROL AND/OR DISABLING CLOSED LOOP ESC |
| HWS OR VGR OR STABILITRAK FAILURE STATUS | LOCKING THE ACTUATOR (NO VARIABLE GEAR RATIO) DURING OPEN LOOP VGR CONTROL AND/OR DISABLING CLOSED LOOP ESC |
| ACTUATOR LOCK STATUS | LOCKING THE ACTUATOR (NO VARIABLE GEAR RATIO) DURING OPEN LOOP VGR CONTROL AND/OR DISABLING CLOSED LOOP ESC |
| ACTUAL FRONT ANGLE DELIVERED | LOCKING THE ACTUATOR (NO VARIABLE GEAR RATIO) DURING CLOSED LOOP ESC |
| AFS FORNT ANGLE MODIFIER COMMAND | LOCKING THE ACTUATOR (NO VARIABLE GEAR RATIO) AND/OR GRACEFUL EXIT DURING CLOSED LOOP ESC |
| VGR OVERRIDE COMMAND | LOCKING THE ACTUATOR (NO VARIABLE GEAR RATIO) AND/OR GRACEFUL EXIT DURING CLOSED LOOP ESC |

*FIG. 2*

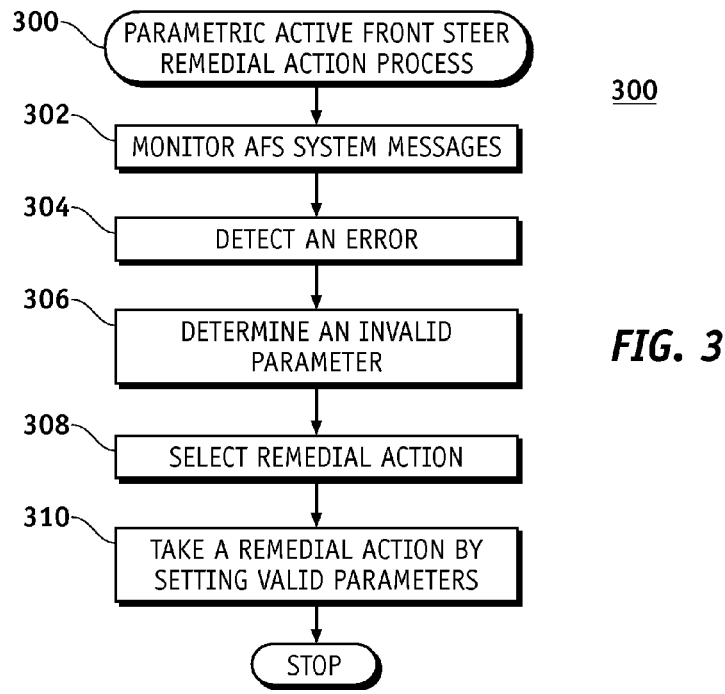

FIG. 3

| HAND WHEEL ANGLE INVALID | LOCK THE ACTUATOR DURING OPEN LOOP VGR CONTROL AND/OR DISABLE CLOSED LOOP ESC |
|---|---|
| HAND WHEEL ANGLE RATE | DEFAULTED OFF |
| DRIVER INTENDED ROAD WHEEL ANGEL (DIRWA) | DEFAULTED OFF |
| ACTUAL FRONT ROAD WHEEL ANGLE (ACTUAL RWA) | DEFAULTED OFF |
| ACTUAL ACTUATOR ANGLE | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK |
| HWS OR VGR OR STABILITRAK FAILURE STATUS | HWS FAILED AND VGR FAILED |
| VEHICLE REFERENCE VELOCITY | NO EFFECT |
| AFS FRONT ANGLE MODIIFER COMMAND | DEFAULTED OFF |
| VGR OVERRIDE COMMAND | DEFAULTED OFF |

| HAND WHEEL ANGLE RATE INVALID | LOCK THE ACTUATOR DURING OPEN LOOP VGR CONTROL AND/OR DISABLE CLOSED LOOP ESC |
|---|---|
| HAND WHEEL ANGLE | DEFAULTED OFF |
| DRIVER INTENDED ROAD WHEEL ANGLE (DIRWA) | DEFAULTED OFF |
| ACTUAL FRONT ROAD WHEEL ANGLE (ACTUAL RWA) | DEFAULTED OFF |
| ACTUAL ACTUATOR ANGLE | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK |
| HWS OR VGR OR STABILITRAK FAILURE STATUS | HWS FAILED AND VGR FAILED |
| VEHICLE REFERENCE VELOCITY | NO EFFECT |
| AFS FRONT ANGLE MODIIFER COMMAND | DEFAULTED OFF |
| VGR OVERRIDE COMMAND | DEFAULTED OFF |

| DRIVER INTENDED ROAD WHEEL ANGLE (DIRWA) INVALID | LOCK THE ACTUATOR DURING OPEN LOOP VGR CONTROL AND/OR DISABLE CLOSED LOOP ESC |
|---|---|
| HAND WHEEL ANGLE RATE | NO EFFECT |
| HAND WHEEL ANGLE RATE | NO EFFECT |
| ACTUAL FRONT ROAD WHEEL ANGLE (ACTUAL RWA) | NO EFFECT |
| ACTUAL ACTUATOR ANGLE | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK |
| HWS OR VGR OR STABILITRAK FAILURE STATUS | VGR FAILED AND STABILITRAK FAILED |
| VEHICLE REFERENCE VELOCITY | NO EFFECT |
| AFS FRONT ANGLE MODIIFER COMMAND | DEFAULTED OFF |
| VGR OVERRIDE COMMAND | DEFAULTED OFF |

*FIG. 6*

| 700 | |
|---|---|
| ACTUAL FRONT ROAD WHEEL ANGLE (ACTUAL RWA) INVALID | LOCK THE ACTUATOR DURING OPEN LOOP VGR CONTROL AND/OR DISABLE CLOSED LOOP ESC |
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL ACTUATOR ANGLE | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK |
| HWS OR VGR OR STABILITRAK FAILURE STATUS | VGR FAILED |
| VEHICLE REFERENCE VELOCITY | NO EFFECT |
| AFS FRONT ANGLE MODIIFER COMMAND | DEFAULTED OFF |
| VGR OVERRIDE COMMAND | DEFAULTED OFF |

*FIG. 7*

| 800 | |
|---|---|
| ACTUAL ACTUATOR ANGLE INVALID | LOCK THE ACTUATOR DURING OPEN LOOP VGR CONTROL AND/OR DISABLE CLOSED LOOP ESC |
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL FRONT ROAD WHEEL ANGLE (ACTUAL RWA) | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK |
| HWS OR VGR OR STABILITRAK FAILURE STATUS | VGR FAILED |
| VEHICLE REFERENCE VELOCITY | NO EFFECT |
| AFS FRONT ANGLE MODIIFER COMMAND | DEFAULTED OFF |
| VGR OVERRIDE COMMAND | DEFAULTED OFF |

| ACTUAL FRONT ANGLE DELIVERED INVALID | LOCK THE ACTUATOR DURING CLOSED LOOP ESC |
|---|---|
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL FRONT ROAD WHEEL ANGLE (ACTUAL RWA) | NO EFFECT |
| ACTUAL ACTUATOR ANGLE | DEFAULTED OFF |
| ACTUATOR LOCK STATUS | NO EFFECT IN VGR MODE AND ACTUATOR PERMANENTLY LOCKED OR FAILURE TO LOCK IN ESC MODE |
| HWS OR VGR OR STABILITRAK FAILURE STATUS | VGR FAILED IN ESC MODE |
| VEHICLE REFERENCE VELOCITY | NO EFFECT |
| AFS FRONT ANGLE MODIIFER COMMAND | DEFAULTED OFF |
| VGR OVERRIDE COMMAND | DEFAULTED OFF |

FIG. 10

| VARIABLE GEAR RATIO (VGR) OVERRIDE COMMAND | LOCK THE ACTUATOR AND/OR GRACEFUL EXIT DURING CLOSED LOOP ESC (FOLLOWED BY NO ESC FOR IGNITION CYCLE |
|---|---|
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL FRONT ROAD WHEEL ANGLE (ACTUAL RWA) | NO EFFECT |
| ACTUAL ACTUATOR ANGLE | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK IN VGR MODE AND NO EFFECT IN ESC MODE |
| HWS OR VGR OR STABILITRAK FAILURE STATUS | VGR FAILED IN VGR MODE AND VGR FAILED AND STABILITRAK FAILED IN ESC MODE |
| VEHICLE REFERENCE VELOCITY | NO EFFECT |
| AFS FRONT ANGLE MODIIFER COMMAND | NO EFFECT |
| VGR OVERRIDE COMMAND | DEFAULTED OFF |

| 1102 — VEHICLE REFERENCE VELOCITY INVALID | 1100 — LOCK THE ACTUATOR DURING OPEN LOOP VGR MODE AND/OR DISABLE CLOSED LOOP ESC — 1104 |
|---|---|
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL FRONT ROAD WHEEL ANGLE (ACTUAL RWA) | NO EFFECT |
| ACTUAL ACTUATOR ANGLE | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK |
| HWS OR VGR OR STABILITRAK FAILURE STATUS | VGR FAILED |
| AFS FRONT ANGLE MODIIFER COMMAND | DEFAULTED OFF |
| VGR OVERRIDE COMMAND | DEFAULTED OFF |

| 1202 — AFS FRONT ANGLE MODIFIER COMMAND INVALID | 1200 — LOCK THE ACTUATOR AND/OR GRACEFUL EXIT DURING CLOSED LOOP ESC (FOLLOWED BY NO ESC FOR IGNITION CYCLE — 1204 |
|---|---|
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL FRONT ROAD WHEEL ANGLE (ACTUAL RWA) | NO EFFECT |
| ACTUAL ACTUATOR ANGLE | NO EFFECT |
| ACTUAL FRONT ANGLE DELIVERED | DEFAULTED OFF |
| ACTUATOR LOCK STATUS | NO EFFECT |
| HWS OR VGR OR STABILITRAK FAILURE STATUS | NO EFFECT IN VGR MODE AND STABILITRAK FAILED IN ESC MODE |
| VEHICLE REFERENCE VELOCITY | NO EFFECT |
| VGR OVERRIDE COMMAND | NO EFFECT |

| 1300 | |
|---|---|
| HWS OR VGR OR STABILITRAK STATUS INVALID (1302) | LOCK THE ACTUATOR DURING OPEN LOOP VGR MODE AND/OR DISABLE CLOSED LOOP ESC (1304) |
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL FRONT ROAD WHEEL ANGLE (ACTUAL RWA) | NO EFFECT |
| ACTUAL ACTUATOR ANGLE | NO EFFECT |
| ACTUAL FRONT ANGLE DELIVERED | DEFAULTED OFF |
| ACTUATOR LOCK STATUS | ACTUATOR PERMANENTLY LOCKED OR FAILURE TO LOCK |
| VEHICLE REFERENCE VELOCITY | NO EFFECT |
| AFS FRONT ANGLE MODIIFER COMMAND | DEFAULTED OFF |
| VGR OVERRIDE COMMAND | DEFAULTED OFF |

FIG. 14

| 1400 | |
|---|---|
| ACTUATOR LOCK STATUS INVALID (1402) | LOCK THE ACTUATOR DURING OPEN LOOP VGR MODE AND/OR DISABLE CLOSED LOOP ESC (1404) |
| HAND WHEEL ANGLE | NO EFFECT |
| HAND WHEEL ANGLE RATE | NO EFFECT |
| DRIVER INTENDED ROAD WHEEL ANGLE (DIRWA) | DEFAULTED OFF |
| ACTUAL FRONT ROAD WHEEL ANGLE (ACTUAL RWA) | NO EFFECT |
| ACTUAL ACTUATOR ANGLE | NO EFFECT |
| ACTUAL FRONT ANGLE DELIVERED | DEFAULTED OFF |
| HWS OR VGR OR STABILITRAK FAILURE STATUS | VGR FAILED AND STABILITRAK FAILED |
| VEHICLE REFERENCE VELOCITY | NO EFFECT |
| AFS FRONT ANGLE MODIFIER COMMAND | DEFAULTED OFF |
| VGR OVERRIDE COMMAND | DEFAULTED OFF |

PARAMETRIC REMEDIAL ACTION STRATEGY FOR AN ACTIVE FRONT STEER SYSTEM

TECHNICAL FIELD

The present invention generally relates to active front steer (AFS) control systems, and more particularly relates to safety measures for automotive active front steering control systems.

BACKGROUND

Vehicle steering is generally controlled by a driver hand wheel that directs the angle of the vehicle wheels used for steering. The movements of the driver hand wheel are transmitted to the vehicle wheels by mechanical linkages and/or electronic components. The vehicle road wheels that change angle are located in the front of the vehicle in a system referred to as "front steering". The angle of the road wheels is referred to as "road wheel angle".

Active front steering (AFS) is a term referring to the use of electronic components to actively control or assist the steering of a vehicle so as to enhance steering performance beyond that possible by only direct mechanical linkages. There are many possible ways to enhance steering performance; for example, steering can be adapted to the weather conditions, to the behavior and habits of the driver, to provide orderly stopping if the driver loses control.

At higher speeds, large changes in the angle of the vehicle wheels can cause undesirable shifts in vehicle direction. Accordingly, precise driver control at high speeds requires subtle changes in the angle of the driver hand wheel. At low and medium speeds, a vehicle generally will be steered into tighter or larger angle turns for parking or manipulating corners. Large turns of the driver hand wheel are usually necessary to make large turns of the vehicle wheels. Driving is easier if the vehicle wheels turn less for corresponding driver hand wheel turns at high speed and more for corresponding driver hand wheel turns at low speed.

In an AFS system, variable gear ratio (VGR) steering is a method for adding and subtracting steering angle to the target road wheel angle implied by the driver's hand wheel input. This can be accomplished by mechanical or electrical components. It is desirable to insure that the VGR system is fail-safe, operates in a safe manner, and does not vary greatly from its intended operational parameters.

Open loop control refers to the operation of a road wheel angle controller without feedback and independent of any supervisory control system. Lead steer is a method of anticipating the driver's intent at the hand wheel that may be implemented in an automotive control module. The AFS system may combine VGR and lead steer to ascertain the target road wheel angle for open loop control.

Closed loop control or electronic closed loop control (ECS) refers to the operation of a road wheel angle controller with feedback from a supervisory control system. For closed loop control, an angle offset from a supervisory control system is added to the VGR steering angle to determine a target road wheel angle that should be implemented by the steering mechanism.

Various types of microcontroller or microprocessor-based controllers found on many conventional vehicles include a supervisory control module (SCM), a hand wheel sensor (HWS) module and an AFS module. Such AFS system modules are typically implemented with any one of numerous types of microprocessors, microcontrollers or other control devices that appropriately receive data from one or more sensors or other sources, process the data to create suitable output signals, and provide the output signals to control actuators, dashboard indicators and/or other data responders as appropriate.

The various components of a vehicle-based control system typically inter-communicate with each other and/or with sensors, actuators and the like across any one of numerous types of serial and/or parallel data links. Today, data processing components within a vehicle are commonly interlinked by a data communication network such as a Controller Area Network (CAN). An example of a CAN is described in ISO Standard 11898-1 (2003).

When there is an error in an AFS system module, security metrics usually call for the locking of the steering actuators within a designated period of time. However, message traffic on the CAN may cause communication delays that prevent timely error detection and/or timely actuator locking. In this regard, the AFS system may not detect errors in a timely manner to lock the AFS actuator within the time allowed by the security metrics. Thus, it is desirable to have an AFS system and method that lowers the time to lock the AFS actuator within the time allowed by the security metrics, reduces the probability of false failure detection, and accurately detects actual failures during steering control.

Other desirable features and characteristics of embodiments of the present invention will become apparent from the subsequent detailed description and the appended claims, taken in conjunction with the accompanying drawings and the foregoing technical field and background.

BRIEF SUMMARY

A system and method for parametric AFS remedial action are disclosed. The method includes monitoring the AFS system messages, detecting an error in the AFS system messages, determining an invalid parameter based upon the error, selecting a remedial action corresponding to the invalid parameter, and taking the remedial action by setting predetermined values for valid parameters corresponding to the invalid parameter.

In one example embodiment, the error may be detected when an AFS system message indicates a parameter is invalid. In another example embodiment of the invention the error may be detected if the occurrence of incorrect AFS system messages reaches or exceeds a certain frequency.

The techniques described herein can lower the time it takes to mechanically lock the AFS actuator if the security metric is not met. Furthermore, the techniques described herein can reduce the probability of false failure detection and accurately detect actual failures during steering control.

BRIEF DESCRIPTION OF THE DRAWINGS

The present invention will hereinafter be described in conjunction with the following drawing figures, wherein like numerals denote like elements.

FIG. 2 is a table of remedial actions corresponding to each invalid parameter for an AFS system;

FIG. 3 is a flow chart that illustrates a parametric AFS remedial action process;

FIGS. 4-14 are tables of default values for valid parameters corresponding to each invalid parameter for an AFS system.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems and that the vehicle system described herein is merely one example embodiment of the invention.

For the sake of brevity, conventional techniques related to signal processing, data transmission, signaling, actuator control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of the invention (assuming that the functionality of the circuit is not adversely affected).

Figure 1:
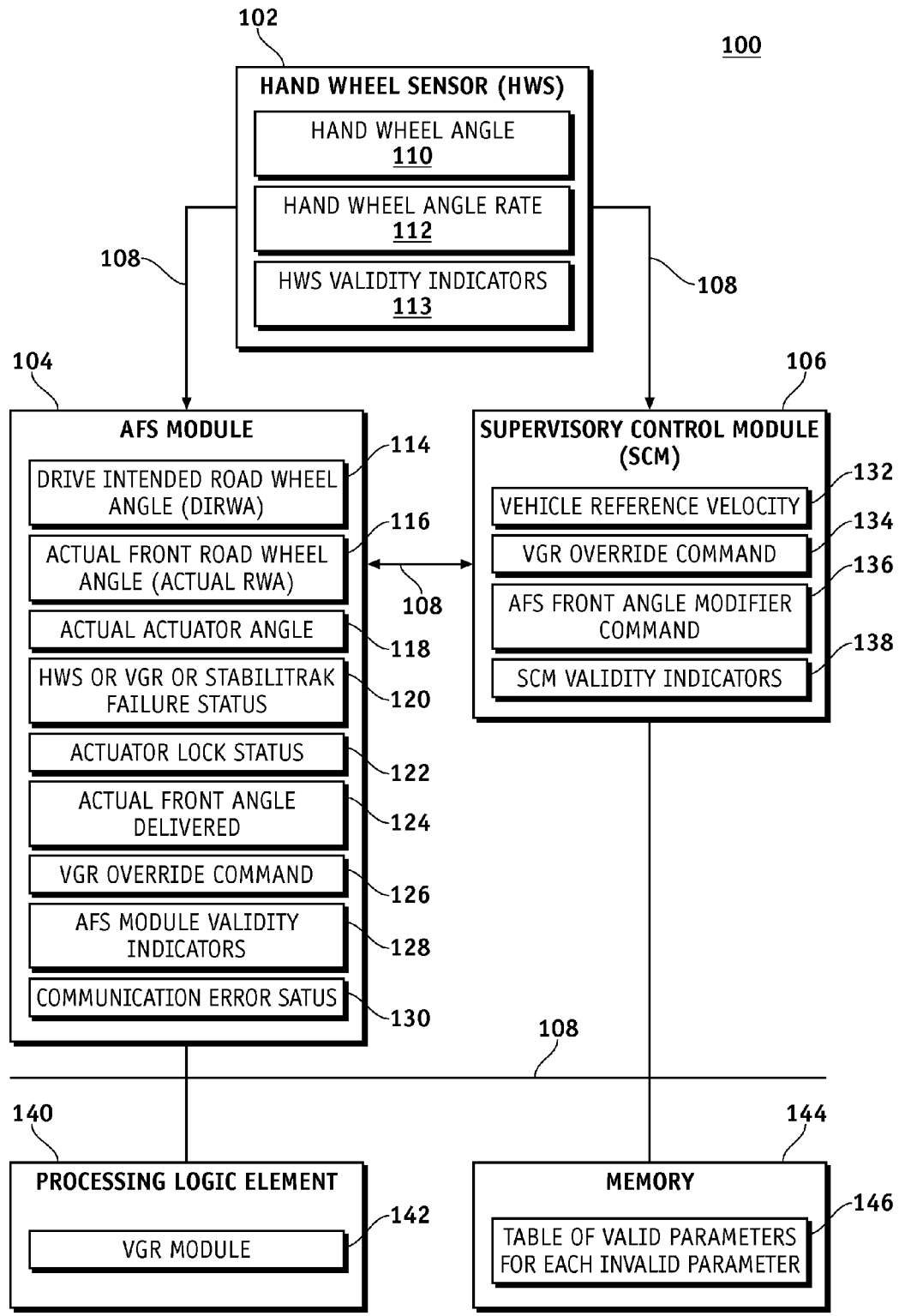
FIG. 1 is a schematic representation of an AFS system configured in accordance with an example embodiment.

FIG. 1 is a schematic representation of an AFS system 100 configured in accordance with example embodiments of the invention. The various blocks depicted in FIG. 1 may be realized in any number of physical components or modules located throughout the vehicle or the AFS system 100. A practical AFS system 100 may include a number of electrical control units (ECUs), computer systems, and components other than those shown in FIG. 1. Conventional subsystems, features, and aspects of AFS system 100 will not be described in detail herein.

AFS 100 generally includes an HWS module 102, an AFS module 104, an SCM 106, a processing logic element 140 which comprises a VGR module 142, and a suitable amount of memory 144 which may comprise a table of the valid parameters for each invalid parameter 146. In practice, these elements may be coupled together using an interconnect bus 108, which may be a CAN bus in a typical vehicle application.

An electronic AFS system 100 uses actuator motors to rotate the front road wheels for a given target road wheel angle. The AFS system 100 uses chains of electronic parts and software to form a control path. The AFS system 100 has a closed loop control mechanism and an open loop control mechanism and various types of AFS system modules including an SCM 106, a HWS module 102 and an AFS module 104. The AFS module 104 sends messages to the SCM 106 and receives messages from the SCM 106. Normally, the SCM 106 and the AFS module 104 only receive messages from the HWS module 102, and neither the AFS module 104 nor the SCM 106 send messages to the HWS module 102 unless the AFS module 104 and/or the SCM 106 require the HWS module 102 to carry out certain operations. The modules of the AFS system 100 inter-communicate their respective parameters to control the AFS actuator within the requirements of the security metrics. Generally, each message contains bitwise and/or bytewise information indicating functional or failure values of each parameter. According to example embodiments, the information in each of the messages is utilized to detect an error, determine an invalid parameter, and take an appropriate remedial action to lock the actuator within the time given by the security metrics in an event a failure occurs.

When there is an error in any of the AFS system modules, security metrics call for the locking of the actuators within a designated period of time. For example, security metrics may require actuator locking within x ms following the detection of an error or a failure. The AFS modules inter-communicate their parameters with each other every z ms via messages sent through a CAN. Locking the AFS actuator itself takes about y ms, thus leaving the AFS system with a window of about (x−y) ms to successfully send an error message to the AFS system indicating a failure.

The (x−y) ms window allows sending (x−y/z) messages depending on whether the messages are synchronized or not. However, because the CAN communication link is highly utilized, it is likely that messages collide in the CAN, which result in missing messages, and must be resent causing a delay of longer than (x−y) ms for a message to successfully reach its destination module. In this regard, the number of messages during which an error may be detected may be $$\left\{ \left[ \frac{(x-y)}{z} \right] - 1 \right\}.$$

Embodiments of the invention described herein can lower the time it takes to mechanically lock the AFS actuator if the security metric is not met. Furthermore, the techniques described herein can reduce the probability of false failure detection and accurately detect actual failures during steering control.

The HWS module 102 is coupled to the AFS module 104 and to the SCM 106. The HWS module 102 is generally configured to receive or generate sensor signals related to the movement of the vehicle hand wheel, and the HWS module 102 may include one or more hand wheel sensors that detect measurable characteristics of the hand wheel (such as the hand wheel angle, the hand wheel angle rate, etc.). The HWS module 102 is configured to send HWS messages containing HWS parameters to the AFS module 104 and to the SCM 106. The HWS parameters may include, without limitation, a hand wheel angle 110, and a hand wheel angle rate 112. Additionally, the HWS messages include HWS validity indicators 113 for the HWS parameters.

The hand wheel angle 110 is a measure of the angle of the driver hand wheel (i.e., the steering wheel), which directs the angle of the vehicle road wheels used for steering. The movements of the driver hand wheel are transmitted to the vehicle road wheels by mechanical linkages and/or electronic components. The angle of the road wheels is referred to as road wheel angle (actual road wheel angle). The hand wheel angle rate 112 is a measure of how fast the driver turns the driver hand wheel per unit of time such as degrees/sec or radians/sec. As mentioned above, generally, each message contains bitwise information indicating functional or failure values of each parameter. For example, bitwise contents of the validity indicator 113 in each HWS message determine whether its respective parameter is valid. In this regard, the HWS module 102 can perform a "self diagnosis" to check whether the messages that contain the hand wheel angle 110 and the hand wheel angle rate 112 are valid.

The AFS module 104 is generally configured to receive hand wheel angle 110 and hand wheel angle rate 112 from the HWS 102 module to control motion of the vehicles wheels based on the road wheel angle requested by the driver and/or commanded by the SCM 106. The AFS module 102 may include one or more actuators that influence the steering position of the road wheel angle and one or more sensors to detect measurable characteristics of the AFS (such as the actual actuator angle). The AFS module 104 is coupled to the SCM 106 and to the HWS module 102 and is configured to send AFS module parameters to the SCM 106 and receive SCM parameters from the SCM 106. The AFS module parameters may be, without limitation: a driver intended road wheel angle (DIRWA) 114, an actual road wheel angle (actual RWA) 116, an actual actuator angle 118, an HWS or VGR or stabilitrak failure status 120, an actuator lock status 122, an actual front angle delivered 124, and a VGR override command 126.

The DIRWA 114 is the vehicle road wheel angle requested by the driver and has the same value as the actual RWA 116 in an open loop control mode. The DIRWA 114 and the actual RWA 116 may have different values in a closed loop control mode. The pinion angle is the hand wheel angle plus the actuator angle. The actual RWA is determined from the pinion angle to RWA transfer function. The actual actuator angle 118 is the angle of the actuator measured by an actuator angle sensor. The actuator angle is utilized as feedback by the AFS system 100 to control the actuator angle control signal. In turn, the AFS actuator angle influences the steering position of the vehicle wheels. The HWS or VGR or stabilitrak failure status 120 indicates a failure in HWS module 102, in VGR module 142 and/or in SCM 106. For example, the failure may be a sensor failure. For this example, the actuator lock status 122 contains four states indicating the actuator lock status: (1) unable to lock the actuator; (2) unlocked (normal case); (3) actuator permanently locked; and (4) actuator temporary locked.

The actual front angle delivered 124 contains information indicating how much of the Actual RWA 116 was actually delivered by the SCM 106 in a closed loop control mode. The VGR override command 126 is an amount by which the VGR was overridden during the closed loop control mode to control the vehicle in a manner different from what the driver commanded via DIRWA 114.

The AFS module inter-communicates the AFS parameters to the SCM 106 via AFS module messages. The AFS module messages may include, without limitation, AFS validity indicators 128 for the AFS module parameters, and a communication error status 130. The bitwise contents of the communication error status contain information indicting whether the AFS module message is correct. In this regard, the AFS module 104 can perform a "self diagnosis" to check whether the messages that contain the AFS parameters are valid.

The SCM 106 is generally configured to detect vehicle movements beyond a normal operational envelope and (in a closed loop mode) command the AFS module 102 to move the vehicle road wheel by an amount different than requested by the driver to assure safety measures are met. The SCM 106 may include one or more sensors to detect the vehicle movements (such as excessive yaw rate). SCM 106 is configured to receive the HWS parameters from the HWS module 102, receive AFS module parameters from the AFS module 104 and send the SCM parameters to the AFS module 104. In this example, the SCM parameters include, without limitation, a vehicle reference velocity 132, a VGR override command 134 and an AFS front angle modifier command 136. The vehicle reference velocity 132 is a velocity computed from the wheel speed sensors and driving conditions such as electronic stability and control events. The VGR override command 134 is same as explained above for the VGR override command 126. The AFS front angle modifier command 136 modifies and/or overrides the actual front road wheel angle 116. The front angle modifier command 136 and the VGR override command 134 have values during closed loop control mode, otherwise they are set by the processor 140 to a predefined negligible value. The SCM module 106 inter-communicates the SCM parameters to the AFS module 104 via SCM messages. Each SCM message includes, without limitation, SCM validity indicators 138 for the SCM parameters. Each of the SCM validity indicators 138 determines whether its respective SCM parameter is valid. In this regard, the SCM module 106 can perform a "self diagnosis" to check whether the messages that contain the SCM parameters are valid.

The processing logic element 140 is coupled to AFS module 104 and may include any number of distinct processing modules or components that are configured to perform the tasks, processes, and operations described in more detail herein. Although only one processing block is shown in FIG. 1, a practical implementation may utilize any number of distinct physical and/or logical processors, which may be dispersed throughout AFS system 100. In practice, the processing logic element 140 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

The memory 144 may be any suitable data storage area that is formatted to support the operation of the AFS system 100. Memory 144 is configured to store, maintain, and provide data as needed to support the functionality of the AFS system 100 in the manner described below. In practical embodiments, memory 144 may be realized as RAM memory, flash memory, ROM memory, EPROM memory, EEPROM memory, registers, a hard disk, a removable disk, a CD-ROM, or any other form of storage medium known in the art. The memory 144 may be coupled to the processing logic element 140 and configured to store values of the HWS parameters, the AFS module parameters, and the SCM module parameters. Additionally, memory 144 may represent a statically or dynamically updating database containing a table of predetermined desired values and/or default values of valid parameters corresponding to each invalid parameter 146 for each remedial action as explained in detail below.

The parameters handled by the techniques and technologies described herein may be selected to suit the needs of the particular deployment, vehicle, or AFS system. For example, default values of the valid parameters may include, without limitation: defaulted off (set invalid); no effect (does not depend on the invalid parameter); previous value prior to error; actuator permanently locked or failure to lock; HWS failed and VGR failed; no effect in VGR mode and defaulted off in ESC mode; no effect in VGR mode and actuator permanently locked or failure to lock in ESC mode; VGR failed in ESC mode; actuator permanently locked or failure to lock in VGR mode and no effect in ESC mode; VGR failed in VGR mode and VGR failed and Stabilitrak (stability and control module) failed in ESC mode; and VGR failed.

In practice, if the AFS system 100 detects an error or failure condition, it can take some form of remedial action in response to the detection. Depending upon the type of error or failure and the specific parameter that is at issue, the AFS system 100 can proceed with a suitable remedial action. In other words, the particular type of remedial action will correspond to the error or failure condition. In this example, the remedial action will correspond to the particular invalid parameters. The remedial actions, may include, without limitation: disabling closed loop electronic stability control (ESC) during open loop VGR control; locking the actuator during open loop VGR control; gracefully exiting during closed loop ESC; and/or locking the actuator during closed loop ESC. Each of the remedial actions are taken to lock the AFS actuator (operate in a fixed mechanical gear ratio in an event an error occurs), during an open loop VGR control mode or during the closed loop ESC mode, within the time specified by the security metrics as explained below.

In practice, the different types of remedial actions may be taken individually or in a suitable combination depending upon the specific parameter that is found to be invalid. FIG. 2 is a table that includes examples of remedial actions 204 corresponding to each invalid parameter 202 for an AFS system. For example, referring to FIG. 2, if the hand wheel angle 212 is invalid, the remedial action is to lock the actuator during open loop VGR control (and continue operation with a fixed gear ratio) and/or disable the closed loop ESC. As another example, if the actual front angle delivered 214 becomes invalid, the remedial action is to lock the actuator 208 during closed loop ESC. FIG. 2 provides a remedial action for eleven different invalid parameters. When a parameter is determined to be invalid, the AFS system 100 takes a remedial action by setting the default values of the values of valid parameters corresponding to the invalid parameter as described in detail below.

FIG. 3 is a flow chart of a parametric AFS remedial action process 300 according to the example embodiment of the invention. The various tasks performed in connection with process 300 may be performed by software, hardware, firmware, or any combination thereof. For illustrative purposes, the following description of process 300 may refer to elements mentioned above in connection with FIG. 1 and FIG. 2. In practical embodiments, portions of process 300 may be performed by different elements of the AFS system 100, e.g., the HWS module 102, the AFS module 104, the SCM 106, the processing logic element 140 and the memory 144.

The AFS system modules generate their own messages for each of their respective parameters and inter-communicate by exchanging the messages. The processor monitors the messages to timely take an appropriate remedial action in event an error occurs. Thus the AFS system remedial action process 300 may begin by monitoring the AFS system messages for error occurrences (task 302). Assuming that an error occurs, the system will detect the error corresponding to an invalid parameter (task 304) and proceed to determine the invalid parameter based upon the error (task 306) as explained in detail below. The invalid parameter may be, without limitation, any one of the AFS modules parameters explained in the context of FIG. 1 above.

Once an invalid parameter has been identified, process 300 selects an appropriate remedial action, as explained in the context of FIG. 2 above, corresponding to the invalid parameter (task 308). The AFS system can then take the selected remedial action by setting valid parameters corresponding to the invalid parameter (task 310) as explained in detail below. The setting of these valid parameters influences the operation of the AFS system such that the selected remedial action results.

FIG. 4 through FIG. 14 include tables depicting the valid parameters corresponding to each invalid parameter for the AFS system 100 according to the example embodiment of the invention. In FIG. 4 through FIG. 14, parameters that are dependent on invalid parameters are set to "defaulted off" (invalid) and valid parameters that are not dependent on invalid parameters are set to "no effect" (no change). Additionally, valid parameters that indicate "status" such as "actuator lock status" and the "HWS/ or VGR/ or stabilitrak status" are set to their appropriate predetermined desired/default values. The AFS system then inter-communicates the desired/default values of the valid parameters corresponding to the given invalid parameter via the messages to lock the AFS actuator within the time allowed by the security metric.

As one example, referring to FIG. 4, the remedial action for hand wheel angle invalid 402 is to lock the actuator during the open loop VGR control and/or during the closed loop ESC 406 (also explained in the context of FIG. 2 above). To take this remedial action the processor sets the valid parameters 408 to their desired values 410, which may include predetermined default values. For example, the hand wheel angle rate 412, the driver intended road wheel angle 414, the actual front road wheel angle 416, the actual front angle delivered 420, the AFS front angle modifier command 428 and the VGR override command 430 are all dependent on the hand wheel angle and are therefore set to "defaulted off". In contrast, the actual actuator angle 418 and the vehicle reference velocity 426 are independent from the hand wheel angle and are set to "no effect" (not changed). The actuator lock status 422 is set to indicate whether the actuator is locked. The HWS/ or VGR/ or stabilitrak failure status 424 is set to indicate whether the HWS, VGR and/or the stabilitrak modules failed. In this example, the AFS module 104 locks the actuator during the open loop VGR mode and sends a message to the SCM indicating the HWS failure.

As an another example, referring to FIG. 5 now, the remedial action for hand wheel angle rate invalid 502 is same as the remedial action 406 in FIG. 4 above. In this regard, the valid parameters are set the same way as in FIG. 4 above, except that the hand wheel angle 512 is now a parameter that is dependent on the hand wheel angle rate and is therefore set to "defaulted off".

As yet another example, referring to FIG. 6 now, the remedial action for the DIRWA invalid 602 is the same as the remedial action explained in the context of FIGS. 4-5 above. To take this remedial action the processor sets the valid parameters 608 to their desired values 610, which may include predetermined default values. In this example (unlike the example in FIG. 5), the hand wheel angle 612, the hand wheel angle rate 614, and the actual front road wheel angle 616 are not dependent on the DIRWA and are therefore set to "no effect". The HWS/ or VGR/ or stabilitrak failure status 624 is set to indicate that both VGR and stabilitrak have failed (since the DIRWA is not a HWS parameter, no failure status is indicated for HWS, unlike the example in FIG. 5). In this regard, the AFS module 104 initiates action to mechanically lock the AFS actuator and sends a message to inform the SCM module 106 that the VGR has failed.

FIG. 7 depicts an example for when the actual RWA is invalid 702. The remedial action is the same as explained above in the context of FIGS. 4-6 above. The valid parameters 708 are set to their predetermined values 710 in the same way as explained in the context of FIG. 5 above except that the DIRWA 716 is now a valid parameter that is dependent on the actual RWA and is therefore set to "defaulted off", and the HWS/ or VGR/ or stabilitrak failure 724 is set to indicate VGR failed only (instead of VGR/ or stabilitrak failed as in FIG. 6).

FIG. 8 depicts an example for when the actual actuator angle is invalid 802. The remedial action, in this example, is the same as explained above for FIGS. 4-7 and the valid parameters 808 are set to their predetermined values 810 as explained above in the context of FIG. 7 except that the actual RWA 818 is now an independent valid parameter (i.e., it is not dependent on the actual actuator angle) and is therefore set to "no effect".

FIG. 9 depicts an example for when the actual front angle delivered 902 is invalid. Since the front angle delivered is an effect caused by the ESC (it has no effect in the open loop VGR control) the remedial action is to lock the actuator during the closed loop ESC 906. In this regard, the valid parameters 908 are set to their predetermined values 910 in the same way as explained in the context of FIG. 8 above, except that the DIRWA 916 and the actual actuator angle 920 are now independent parameters and are therefore set to "no effect". The actuator lock status 922 is also set the same way as explained in FIG. 8 above except it is set to "no effect" when operating in the open loop VGR control mode. The HWS/ or VGR/ or stabilitrak failure status 924 is set to VGR failed in ESC mode to cause the AFS system to lock the actuator in ESC mode and continue operation in one gear ratio (accordingly, the AFS front angle modifier command 926, and the VGR override command 928 are "defaulted off" or set to invalid, since they are parameters that command a change in the gear ratio during the ESC mode, which is not desired when the actual front angle delivered is invalid 902).

FIG. 10 depicts another example where the VGR override command 1002 is invalid. In this example, the remedial action is to lock the actuator and/or gracefully exit (with the angle modifier command) during closed loop ESC 1004 followed by no ESC for ignition cycle. In this example the AFS system takes the VGR override command out, gracefully, by gradually reducing the closed loop actuator command and reverts to VGR mode. The AFS systems will continue operation in the open loop VGR mode and will not revert back to the ESC mode for the duration of the ignition cycle (start to stop of vehicle engine). The valid parameters 1008 are set to their predetermined values 1010 as explained in the context of FIG. 9 above except that the DIRWA 1016 and the actual front angle delivered 1020 are now dependent on the VGR override command and are therefore set to "defaulted off", and the AFS front angle modifier command 1030 is now an independent parameter and is therefore set to "no effect". The HWS/ or VGR/ or stabilitrak 1026 is set to VGR failed in VGR mode and stabilitrack failed in ESC mode.

FIG. 11 is an example where the vehicle reference velocity 1102 is invalid. The valid parameters 1108 are set to their predetermined values 1110 as explained in the context of FIG. 8 above, except that the actual actuator angle 1120 is now an independent parameter (instead of an invalid parameter) and is therefore set to "no effect", and the vehicle reference velocity is now an invalid parameter.

FIG. 12 is an example where the AFS front angle modifier command is invalid 1202. The remedial action is to lock the actuator and/or gracefully exit during closed loop ESC 1204 as explained in the context of FIG. 10 above. The valid parameters are set to their predetermined values 1210 as explained in the context of FIG. 11 above. An exception is that the actuator lock status 1224, the vehicle reference velocity 1228, and the VGR override command 1230 are now independent parameters since they don't depend on the AFS angle modifier command and are therefore set to "no effect". The HWS/ or VGR/ or stabilitrak is set to "no effect" during the open loop VGR mode (since the front angle modifier command is a parameter affected during the ESC mode) and it is set to stabilitrak failed during the closed loop ESC mode.

FIG. 13 is another example where the HWS/ or VGR/or stabilitrak status 1302 is invalid. The remedial action is the same as the remedial action explained in the context of FIGS. 4-8 and FIG. 11 above. The valid parameters 1308 are set to their predetermined values 1310 in the same way as explained in the context of FIG. 12 above except that the AFS front angle modifier command 1328 and the VGR override command 1330 are now dependent parameters and are therefore set to "defaulted off". Also different from FIG. 12 is that the actuator lock status 1324 is set to indicate the actuator lock status as explained above in the context of FIG. 1.

FIG. 14 is an example of when the actuator lock status is invalid 1402. The remedial action is the same as the remedial action explained in the context of FIG. 13 above. The valid parameters 1408 are set to their predetermined values 1410 also the same way as explained in the context of FIG. 13 above except that the HWS/ or VGR/ or stabilitrak status 1424 is now set to VGR/ or stabilitrack failed.

According to example embodiments of the invention, the error may be detected in two ways: 1) when an AFS system message indicates a parameter is invalid and 2) if occurrence of an incorrect AFS system message reaches or exceeds a certain frequency as explained in detail below.

Figure 15:
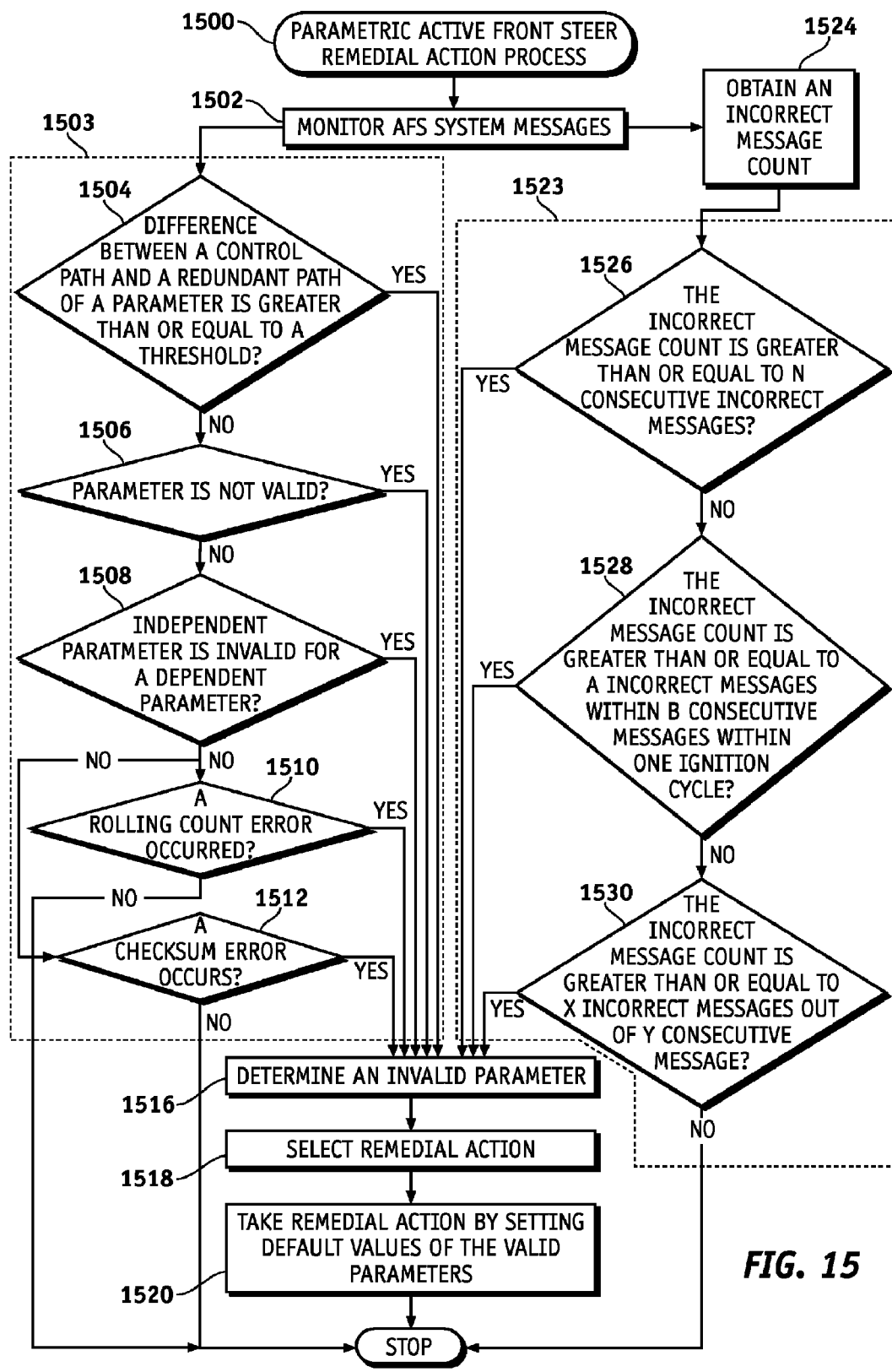
FIG. 15 is a flow chart that illustrates a parametric AFS remedial action process.

FIG. 15 is a flow chart of a parametric AFS remedial action process 1500. This process provides a more detailed depiction of error detection processes that may be performed by an AFS system as described herein. The various tasks performed in connection with process 1500 may be performed by software, hardware, firmware, or any combination thereof. For illustrative purposes, the following description of process 1500 may refer to elements mentioned above in connection with FIGS. 1-14. In practical embodiments, portions of process 1500 may be performed by different elements of the AFS system 100, e.g., the HWS module 102, the AFS module 104, the SCM 106, the processing logic 140, and the memory 144.

In one example embodiment, process 1500 may begin by monitoring AFS system messages (task 1502). Such monitoring enables process 1500 to monitor the AFS system for error occurrences. In this example, process 1500 checks the plurality of error conditions in the AFS system messages (identified by reference number 1503) to detect an error and determine the invalid parameter based upon the error. For purposes of illustration and for simplicity, process 1500 will be described in the context of handling a single parameter. In practice, process 1500 can concurrently (or serially) handle any number of parameters, including those described above in connection with FIG. 1 and FIG. 2.

In connection with the checking procedure 1503, process 1500 may check whether a difference between a control path version and a redundant path version of a parameter is greater than or equal to a threshold (inquiry task 1504). To assure integrity of the data in the messages prior to use, the AFS system utilizes a dual path control system including a primary and redundant control path. In this regard a parameter is copied on the redundant path and compared to its original value in the primary path prior to transmission to its destination module via a message. If the difference is greater than or equal to the threshold (the specific threshold value may be predetermined by the security metrics), then the parameter is determined to be invalid and process 1500 proceeds to a task 1516. Otherwise, process 1500 may proceed to check whether a parameter is not valid (inquiry task 1506) by checking the validity indicator of the parameter as explained above. If the parameter is not valid, process 1500 proceeds to task 1516. Otherwise process 1500 may proceed to check whether an independent parameter is invalid for a dependent parameter (inquiry task 1508).

Independent parameters are parameters that are directly measured from, for example, a measurement module, such as the road wheel angle which is directly measured from a sensor. The dependent parameters are derived from the independent parameters. For example, the actual RWA is a dependent parameter since it is derived from the actual actuator angle. If the independent parameter is invalid for the dependent parameter, process 1600 proceeds to task 1516. Otherwise process 1500 proceeds to check whether a rolling count error occurred (inquiry task 1510). A rolling count is intended to indicate, to the module receiving the rolling count, how many messages are missing. For example, a rolling count of 0-1-2-3 (0 followed by 1, 2 and 3) corresponds to a functional value (no messages are missing) of the rolling count, otherwise it indicates a failure value (one or message are missing). In particular, a value of 0 indicates presence of a first message, a value of 1 indicates presence of a second message, a value of 2 indicates presence of a third message, and a value 3 indicates presence of a fourth message. For example, if a rolling count of 0-0 (0 followed by a 0) occurs, the rolling count indicates messages 1, 2 and 3 are missing. If a rolling count error occurred, process 1500 proceeds to task 1516 otherwise process 1500 ends.

If an independent parameter is invalid for a dependent parameter (inquiry task 1508), concurrently with and independently of task 1510, process 1500 checks whether a checksum error occurred (inquiry task 1512). If a checksum error occurred, then process 1500 proceeds to task 1516, otherwise process 1500 ends.

A checksum may be bytewise, nibblewise or wordwise information calculated from all the information in an AFS module message. It verifies whether the information in the message is correct. The checksum in this case can refer to any sort of parity, cyclic redundancy code (CRC), digest, or other technique for representing the contents of AFS messages. Process 1500 determines the invalid parameter by checking the information content of the message containing the error. The information content of the message includes, without limitation, the failure and functional values of the checksum, the rolling count, the communication error status, and the validity indicator of the parameter.

Task 1516 may be performed to determine or resolve the particular invalid parameter. Once the invalid parameter is determined, process 1500 proceeds by selecting an appropriate remedial action (task 1518) and taking the selected remedial action (task 1520) as explained in the context of FIG. 3 above.

According to another example embodiment of the invention, process 1600 may detect an error by checking whether the occurrence of incorrect messages reach or exceed a certain measure (procedure 1523), e.g., a frequency of occurrence, a pattern of incorrect messages, or the like. In this regard, process 1500 obtains an incorrect message count (task 1524) and checks the incorrect message count against a suitable predetermined measure. In one embodiment, process 1500 checks whether the incorrect message count indicates a count that is greater than or equal to a specified number (for example, three) of consecutive incorrect messages (inquiry task 1526). Process 1500 may also check whether the incorrect message count indicates a count that is greater than or equal to a specified number (for example, two) of incorrect messages within one ignition cycle (inquiry task 1628). Process 1500 may also check (inquiry task 1530) whether the incorrect message count indicates that X incorrect messages have occurred within Y consecutive messages (for example, if more than two of four consecutive messages are incorrect, the parameter is deemed invalid). Typically X is about four and Y is about ten. The processor checks the communication error status, as explained above, to determine whether a message is incorrect. If a result of any of the inquiry tasks 1526, 1528 or 1530 is "yes", then process 1500 proceeds to task 1516 as described above. Otherwise, process 1500 ends.

An AFS system as described herein can utilize the security techniques to lower the time to lock the AFS actuator in the event the security metrics are not met, reduce the probability of false failure detection, and accurately detect actual failures during steering control.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for parametric active front steer (AFS) remedial action for a vehicle having an onboard variable gear ratio (VGR) AFS system comprising a processor device, the method comprising:

detecting, with the processor device of the AFS system, an error corresponding to an invalid AFS parameter associated with operation of the AFS system of the vehicle;

selecting, with the processor device of the AFS system, and from a plurality of remedial actions corresponding to a plurality of invalid AFS parameters, a remedial action corresponding to the invalid AFS parameter; and taking the remedial action by locking an AFS actuator of the AFS system to disable VGR steering, operating the AFS system in a fixed mechanical gear ratio mode, and setting valid parameters corresponding to the invalid AFS parameter.

2. A method according to claim 1, further comprising monitoring AFS system messages for error occurrences.

3. A method according to claim 1, wherein the detecting step comprises detecting the error if:
a difference between a control path version and a redundant path version of a parameter is greater than or equal to a threshold;
an independent parameter is invalid for a dependent parameter;
a rolling count error occurs; or
a checksum error occurs.

4. A method according to claim 1, wherein the detecting step comprises:
obtaining an incorrect message count; and
detecting the error if the incorrect message count is greater than or equal to a predetermined measure.

5. A method according to claim 4, wherein the predetermined measure comprises a number of consecutive incorrect messages.

6. A method according to claim 4, wherein the predetermined measure comprises X incorrect messages within Y consecutive messages, where Y is greater than or equal to X.

7. A method according to claim 4, wherein the predetermined measure comprises a number of incorrect messages within an ignition cycle.

8. A method according to claim 1, wherein the remedial action comprises disabling closed loop electronic stability control (ESC) during open loop variable gear ratio (VGR) control.

9. A method according to claim 1, wherein the remedial action comprises locking the AFS actuator during open loop variable gear ratio (VGR) control.

10. A method according to claim 1, wherein the remedial action comprises gracefully exiting during closed loop electronic stability control (ESC).

11. A method according to claim 1, wherein the remedial action comprises locking the AFS actuator during closed loop electronic stability control (ESC).

12. A method according to claim 1, wherein the invalid parameter represents one of: a hand wheel angle, a hand wheel angle rate, a driver intended road wheel angle, an actual front road wheel angle, an actual actuator angle, an actual front angle delivered, a variable gear ratio (VGR) override command, an actuator lock status, a hand wheel sensor (HWS) failure status, a VGR failure status, a vehicle reference velocity, or an AFS front angle modifier command.

13. A method for parametric active front steer (AFS) remedial action for a vehicle having a variable gear ratio AFS system that operates in accordance with a plurality of AFS parameters, the method comprising:
maintaining, in at least one memory element of the AFS system, a table of a plurality of invalid AFS parameters and a plurality of corresponding remedial actions, each of the remedial actions having a respective plurality of valid AFS parameters that cause the AFS system to lock an AFS actuator to disable variable gear ratio steering, resulting in a fixed mechanical gear ratio steering mode;
obtaining, at a processor device of the AFS system, an incorrect message count;
detecting, at the processor device of the AFS system, an error if the incorrect message count is greater than or equal to a predetermined measure;
determining, at the processor device of the AFS system, an invalid AFS parameter from the plurality of invalid AFS parameters upon detecting the error; and
setting default values of valid AFS parameters corresponding to the invalid AFS parameter.

14. A method according to claim 13, wherein the determining step comprises determining the invalid AFS parameter corresponding to a parameter received via a correct message prior to detecting the error.

15. An active front steer (AFS) system for a vehicle, the system comprising:
an AFS module;
an AFS actuator;
a supervisory control module (SCM) coupled to the AFS module;
a hand wheel sensor (HWS) module coupled to the AFS module and to the SCM, the HWS module being configured to send HWS parameters to the SCM and to the AFS module, wherein the AFS module is configured to send AFS module parameters to the SCM and to receive SCM parameters from the SCM; and
a processing logic element coupled to the AFS module, and configured to:
monitor AFS system messages for error occurrences;
detect an error corresponding to an invalid AFS parameter, wherein the invalid AFS parameter is one of a plurality of invalid AFS parameters, each of the invalid AFS parameters having a respective remedial action, each remedial action having a respective plurality of valid AFS parameters that cause the AFS system to lock the AFS actuator to disable variable gear ratio steering, resulting in a fixed mechanical gear ratio steering mode;
select a remedial action corresponding to the invalid AFS parameter; and
take the remedial action by setting the valid AFS parameters corresponding to the invalid AFS parameter.

16. A system according to claim 15, wherein the processing logic element is further configured to:
obtain an incorrect message count;
detect the error if the incorrect message count is greater than or equal to a predetermined measure;
determine the invalid AFS parameter based upon the error; and
set default values of valid AFS parameters corresponding to the invalid AFS parameter.

17. A system according to claim 15, wherein the processing logic element is further configured to obtain the invalid AFS parameter from a correct message received prior to detecting the error.

18. A system according to claim 15, further comprising a variable gear ratio control (VGR) module coupled to the processing logic element.

19. A system according to claim 15, further comprising a memory module coupled to the processing logic element and configured to store tables of valid AFS parameters corresponding to each invalid AFS parameter.

* * * * *